United States Patent [19]

Beck

[11] 3,919,404
[45] Nov. 11, 1975

[54] HYDROTHERMAL PROCESS FOR PREPARATION OF ALPHA IRON OXIDE CRYSTALS

[75] Inventor: Henry Nelson Beck, Walnut Creek, Calif.

[73] Assignee: The Dow Chemical Company, Midland, Mich.

[22] Filed: June 28, 1974

[21] Appl. No.: 484,044

[52] U.S. Cl............................. 423/633; 252/62.56
[51] Int. Cl.$^2$........................................ C01G 49/02
[58] Field of Search .......... 423/632, 633, 634, 140, 423/141, 146; 252/62.56, 62.61

[56] References Cited
UNITED STATES PATENTS

| | | | |
|---|---|---|---|
| 1,848,660 | 3/1932 | Renkwitz | 423/633 |
| 2,296,423 | 9/1942 | Clark | 423/146 X |
| 2,416,744 | 3/1947 | Francis | 423/144 |
| 2,558,302 | 6/1951 | Marcot | 423/633 |
| 3,075,919 | 1/1963 | Gruber et al. | 252/62.56 |
| 3,493,365 | 2/1970 | Pickering et al. | 423/140 X |
| 3,743,707 | 7/1973 | Iwase et al. | 423/634 X |
| 3,793,432 | 2/1974 | Weston | 423/146 X |
| 3,798,304 | 3/1974 | Weston | 423/146 X |
| 3,845,198 | 10/1974 | Marcot | 423/633 X |
| 3,867,516 | 2/1975 | Bodson | 423/632 |

OTHER PUBLICATIONS

Chemical Abstracts, Vol. 68, 1968, No. 32151v.
Chemical Abstracts, Vol. 65, 1966, No. 6407(g).

*Primary Examiner*—Oscar R. Vertiz
*Assistant Examiner*—Brian E. Hearn
*Attorney, Agent, or Firm*—Robert R. Stringham

[57] ABSTRACT

Elongated, polycrystalline particles of alpha iron oxide, characterized by an open, porous structure and consisting of hematite microcrystallites containing from 2 to 4 percent of sulfate are prepared by the reaction of lithium hydroxide and ferric sulfate in weakly acidic to neutral aqueous solution under at least autogenous pressures at temperatures in the range of 150°–350°C. The particles are readily converted to gamma iron oxide of good magnetic properties and also have utility as pigments and catalysts.

4 Claims, No Drawings

HYDROTHERMAL PROCESS FOR PREPARATION OF ALPHA IRON OXIDE CRYSTALS

BACKGROUND OF THE INVENTION

A variety of iron oxides have found use as pigments, catalysts, ferrites and as components in magnetic recording media. The preparation of iron oxide particles is an extensively developed, but still highly empirical, art. An illuminating commentary on the complexities involved has been provided by T. Takada (Denki Kagaku Oyobi Kogyo Butsuri Kagaku, 37 (5 ), pp. 328–335 (1969) ). These complexities presumably account for the publication of hundreds of papers and patents on the hydrolysis of iron salts and iron oxide preparative processes.

The processes and products disclosed in the following patents and papers are the closest art to the present invention known to Applicant.

U.S. Pat. No. 2,416,744 describes the preparation of orange-red, iron oxide particles of undisclosed structure by hydrolysis of oxidized ferrous sulfate solutions with a base, such as $NH_4OH$ or LiOH, at a pH of 6 to 11 and at a temperature of 60°–75°C. Only pigment utility is taught.

U.S. Pat. No. 2,558,302 teaches the preparation of needle-shaped, iron oxide crystals, less than 0.1 micron in diameter, by the base hydrolysis of ferric salts under strongly alkaline conditions at 40°–95°C. A dependency of non-agglomerating character on a combined anion content of less than 1% is taught. No further details of structure or composition are given.

U.S. Pat. No. 2,866,686 discloses the preparation of acicular alpha iron oxide particles about 0.25 to 1.5 microns long, 0.1 to 0.3 microns wide and having a cubic crystal lattice. One equivalent of ferrous sulfate is reacted with 0.87 equivalents of sodium hydroxide and the resulting precipitate oxidized at about 60° for up to four hours. The acicular particles are convertible to magnetic iron oxides having coercive forces of from 220–360 oersteds. Nothing more is disclosed as to fine structure of any of the oxide particles.

U.S. Pat. No. 3,009,821 describes the hydrolytic preparation of mixtures of rhombohedral and acicular hematite particles by the reaction of ferrous sulfate and alkali hydroxide under oxidizing conditions at 50°–100°C. and at a pH of 4 or less in the presence of a colloidal iron oxide seed. A dependency of particle acicularity on the iron concentration and reactant ratio employed for seed preparation is taught. The maximum dimensions of the hematite particles vary from "well under" 0.2 micron to "somewhat larger" than 0.2 micron.

U.S. Pat. No. 3,082,067 discloses the preparation of prismatic gamma ferric hydroxide (hematite) particles by reacting ferrous sulfate with sodium hydroxide at 0°–35°C. and oxidizing the resultant slurry at 55°–60°C. Dehydration of the hematite particles gives isometric, prismatic crystals of "ferromagnetic gamma ferric oxide".

British Pat. No. 656,265 discloses the growth of hematitecontaining iron oxide particles of greater than colloidal dimensions by "agglomeration" of smaller particles while heating ferric hydroxide in the presence of ferrous and cupric or zinc ions at temperatures of 150° or higher with minimal agitation. The ferric hydroxide may be preformed by reaction of ferric sulfate with excess alkali hydroxide. No further disclosure as to crystal structure, shape or size is provided.

S. Nobuoka (Kogyo Kagaku Zasshi 68 (12), 2311–17 (1965); C.A 65 6407g) examined, by X-ray diffraction and infrared absorption, the precipitates formed in the reaction between ferric sulfate and sodium hydroxide in aqueous solutions. The precipitate formed at pH 5–6 is an amorphous basic ferric sulfate which can be converted to cubic hematite crystals by hydrothermal treatment at 120°–130°C. At pH 12–13, amorphous Fe-(OH)$_3$ precipitates and then gradually alters to "needles" of alpha-(FeOOH). The latter product can be converted to alpha-fe$_2$O$_3$ (hematite) by hydrothermal treatment at 200°–300°C.

C. J. Haigh (Australasian Inst. of Mining and Metallurgy, Proc. 223, 49–56 (1967); C.A. 68 32151v) obtained Fe$_2$O$_3$ from acidic solutions of pure ferric sulfate at 200°C. and from similar solutions also containing Na$_2$SO$_4$, Na$_2$CO$_3$, NH$_4$OH or K$_2$SO$_4$ at temperatures from 180°–220°C.

Takada (loc. cit.) discloses the preparation of iron compounds having jarosite structures in acidic iron sulfate solutions containing alkali metal ions. In acid solution, the type of product precipitated depends on temperature and the type of anion present. A reference is given in Table III of this paper to the reaction of FeCl$_3$ at 150°C. with more than three molecular proportions of LiOH to produce a lithium ferrite.

It is evident from the foregoing publications that a number of interdependent variables are determinative of the types of products which are obtained by the hydrolysis of iron salts. The properties of a given iron oxide product are determined by the shape, size, fine structure and chemical composition of the particles of which it is composed. In order to obtain particles of a specific type, a narrowly specified set of reaction parameters must be maintained.

SUMMARY OF THE INVENTION

It has been discovered that a new and highly useful kind of hematite particle is obtained from the hydrothermal reaction of ferric sulfate with lithium hydroxide and the accompanying crystal growth in acidic solution.

The new particles are porous, elongated, impure hematite particles having lengths of from about 0.05 to 5 microns, effective diameters of from about 0.02 to about 0.9 microns and aspect ratios of from about 1.2 to about 6. They are physically composed of elongate microcrystallites, loosely adhered together in the form of a generally cylindrical bundle with their long axes generally parallel to the long axis of the bundle. The microcrystallites have effective diameters of from about 80A up to about half the effective diameter of the bundle. The particles are chemically composed of alpha iron oxide containing from about 2 to about 4 weight percent of chemically-bound sulfate and from about 0.003 to about 0.02 weight percent of chemically-bound lithium.

By the term "loosely adhered" is meant that the microcrystallites are not continuously joined by interstitial matter. The new particles are analogous to bundles of twigs which touch each other at numerous points but generally not along their entire lengths. The process by which the particles are made comprises:

a. providing a mixture consisting essentially of ferric sulfate, water and lithium hydroxide in which the concentration of the iron sulfate is about 0.2 to 2.0 molar, the atomic ratio of lithium to iron is from about 0.7 to 1.5 and the total content of phosphate, molybdenum and tungsten is less than 0.001 molar;
b. heating the mixture to a temperature within the range of about 150° to about 350°C. at a rate of from about 1° to about 38°C./minute;
c. maintaining the mixture at said temperature under at least autogenous pressure for a time period of from about one minute to about 80 hours;
d. cooling the mixture; and
e. recovering the resultant particles.

The alpha-$Fe_2O_3$ (hematite) product can be converted, without undergoing significant morphological changes, to magnetic oxides having a desirable combination of magnetic properties. Conventional reduction and reoxidation procedures are suitable for these conversions.

The hydrolysis can be summarized by the following equations:
1. $Fe_2(SO_4)_3 + 2LiOH + 2H_2O \rightarrow 2$ FeOOH (Goethite) $+ 2LiHSO_4 + H_2SO_4$
2. $2FeOOH \rightarrow Fe_2O_3$ (alpha-iron oxide) $+ H_2O$.

The reduction and reoxidation steps can be represented by the equations:
3. $3Fe_2O_3 + H_2 \rightarrow 2Fe_3O_4$ (magnetite) $+ H_2O$
4. $4Fe_3O_4 + O_2 \rightarrow 6Fe_2O_3$ (gamma iron oxide).

The sulfate content of the hematite crystals (approximately 2–4 weight percent) corresponds to 14 to 30 $Fe_2O_3$ units per sulfate group. Thermal gravimetric analysis has established that from 1 to 3 weight percent of absorbed (not bound) water is usually present. The water content can be removed by heating without alteration of the crystal structure but loss of the residual sulfate is accompanied by a change in morphology which first becomes evident at 700°C. Temperatures greater than 800°C. are required to achieve complete sulfate removal.

DETAILED DESCRIPTION OF THE INVENTION

The process of the invention is carried out as follows:

Preparation of the Reaction Mixture

The aqueous LiOH and ferric sulfate solutions are mixed, as by stirring or shaking. It is preferred to add the LiOH solution to the ferric sulfate solution. If the reverse procedure is followed, an initial precipitate of ferric hydroxide forms which will not readily dissolve without heating. The desired product can be obtained from the redissolved precipitate upon further heating but the overall process is substantially less efficient.

The reaction mixture must consist essentially of LiOH, $Fe_2(SO_4)_3$ and water. Other ions, such as bromide, chloride, nitrate, perchlorate, sodium, potassium, ammonium, barium, or calcium may be present in incidental amounts but tend to alter product morphology and preferably are not present in detectable quantities. It is critical to product morphology that the total content of phosphate, molybdenum and tungsten be less than 0.001 molar. It is highly preferred that the total content of phosphate, molybdenum, tungsten, vanadium, antimony, chromium, arsenic, copper and titanium does not exceed the latter figure.

The concentration of iron in the reaction mixture should be within the range of from about 0.4 to about 4.0 gram ions per liter (0.2 to 2.0 molar in $Fe_2(SO_4)_3$). At ferric sulfate concentrations of less than 0.2 molar, reaction rates are low and the product obtained includes a substantial proportion of crystals which have aspect ratios of less than 1.2 and are shorter than 0.05 micron. Concentrations of ferric sulfate greater than 2 molar are not attainable at room temperature. Preferably, the ferric sulfate concentration is from about 0.4 to about 0.6 molar. Within this range — and particularly at lower lithium to iron ratios — hematite crystals exhibiting pronounced acicularity and having lengths up to about 5 microns are obtained. A concentration of about one gram ion of iron per liter (0.5 molar $Fe_2(SO_4)_3$) is considered optimal.

The concentration of lithium hydroxide in the reaction mixture must be such that the atomic ratio of lithium to iron will be within the range of about 0.7 to about 1.5 (mole ratio LiOH to $Fe_2(SO_4)_3$ from about 1.4 to about 3.0). The pH of the mixture depends on the LiOH concentration and has an important effect on particle morphology and size. The acicularity, porosity, and size of the hematite particles all decrease as the ratio of LiOH to $Fe_2(SO_4)_3$ increases. Although aspect ratios up to about 3 can still be observed (electron microscope) at concentrations of 2 moles LiOH and 0.5 moles $Fe_2(SO_4)_3$, the essential characteristics of the particles are no longer apparent and uniformity of size and shape is lost. On going from an LiOH to $Fe_2(SO_4)_3$ ratio of about 1.4/0.5 to about 1.7/0.5, a pronounced decrease in size occurs.

On the other hand, the ferric oxide yield increases as the pH goes up. A good compromise range for the lithium to iron atomic ratio is from about 0.9 to about 1.2. A ratio of about one is considered optimal.

At ratios of less than 0.7 gram ions of lithium per gram ion of iron, substantial proportions of basic iron sulfates are included in the hydrolysate.

Heat-up

The rate at which the reaction mixture is brought to the reaction temperature is determinative of the fine structure, shape and size of the product particles. Rates below about 6°/minute favor formation of denser, smoother, better defined particles. The particles obtained at heat-up rates of about 2°–4°/minute tend to assume a characteristic shape in which the crystallite bundle resembles a sheaf of straws constricted at the middle by a binding string. That is, the effective diameter of the crystallite bundle is greater at each end than in the middle. In general, as the heat-up rate increases, the effective diameter of the crystallites increases and the length of the particle as a whole decreases.

Heating rates as low as 1°/minute may be employed but are economically unattractive and — particularly when higher reaction temperatures are to be attained — tend to give lower yields. Rates in excess of 20°/minute result in progressively smaller, more poorly defined particles having rougher and looser structures. Accretion on individual crystallites apparently is favored relative to orderly formation of new crystallites at high heat-up rates.

Since part of the conversion of the initial precipitate (goethite) to hematite can occur during the latter stages of heat-up, higher heat-up rates are more suitable when reaction temperatures above about 300°C. are to be attained.

Rates of up to about 38°/minute have produced useful hematite particles, even at reaction temperatures as low as 250°C. However, it is preferable not to exceed a heat-up rate of about 20°/minute.

For reaction temperatures in the preferred range of about 240° to about 260°C., heat-up rates of about 3°/minute to about 12°/minute are highly preferred.

No important difference in the properties of magnetic iron oxides prepared from hematite particles formed at higher and lower heat-up rates has been found.

Reaction Time and Temperature

The heated mixture is maintained at the selected reaction temperature, preferably with agitation, for a period of from about one minute to about 24 hours or more. In general, the higher the temperature, the briefer will be the minimum reaction time required. Preferably, the temperature of the mixture is held within the range of about 240° to about 260° for a period of from about 1.75 to about 2.25 hours.

The initial hydrolysis and precipitation (of goethite, i.e., FeOOH or $Fe_2O_3.H_2O$) is believed to proceed through one or more partially hydrolyzed intermediates during the heat-up period. Thereafter, dehydration and crystal growth are the predominant processes. Crystal growth apparently involves simultaneous dissolution of precipitate and formation of, or deposition on, other particles. The reaction times employed in economic practice of the invention usually will not suffice for an equilibrium between these two processes to be attained. However, essentially complete conversion of goethite to acicular hematite crystals will be realized.

A reaction time of at least one hour appears necessary to achieve complete conversion of goethite to hematite at about 200°C. At 250°C., conversion to hematite and crystallization is essentially complete after one-half hour. Upon continued heating, crystal maturation, accompanied by some decrease in average crystal size takes place. A typical change is from an average length of 1.2 microns (after one-half hour at 250°C) to an average length of 0.88 microns (after 70 hours at 250°C.). The particles also become more uniform in shape and size.

Quite brief residence times — on the order of one minute, for example — may be employed at elevated temperatures, such as in the vicinity of 350°C. This is particularly so when relatively low heat-up rates, i.e., less than about 12°/minute, are used.

Goethite conversion proceeds so slowly at temperatures below about 150° that the process becomes impracticable. At temperatures above 350°C., excessive working pressures must be designed for and corrosion problems become very severe. Temperatures of about 200°–280°C. are more suitable and temperatures in the range of about 240°C. to about 260°C. are preferred. For mixtures which are 0.5 molar in ferric sulfate and 1.0 molar in lithium hydroxide, a temperature of about 250° is most preferred.

Better yields of product are obtained at higher temperatures. For example, the yields obtained from mixtures of the latter composition after 3 hours at 200°, 2 hours at 225° and 2 hours at 250° were respectively about 56, 59 and 67%. After 12 hours at 250°C., a further yield increase to about 74% resulted and after 24 hours the yield was increased a little more (to 77.4%). Essentially no further yield improvement resulted after 77 hours at 250°C.

Cool-down Rate

Slow cooling has been found necessary if it is desired to avoid inclusion of jarosites (basic iron sulfates) in the product. The reason for this is uncertain. The maximum cooling rate which can be employed in a given operation will depend on the amount of jarosite, if any, which can be tolerated in the product. This rate can readily be determined for any particular combination of reaction mixture composition, heat-up rate, reaction temperature and reaction time. In general, however, a cooling rate of not more than 3°/ minute should be maintained until the temperature of the reaction mixture has been reduced to 150°C. Preferably, the mixture is cooled at a rate of not more than 1°/minute until a temperature of 125°C. or less is reached.

Pressure

The hydrolysis is carried out under a pressure at least equal to the autogenous pressure developed by a mixture of the selected composition at the reaction temperature employed. Higher than autogenous pressures may be employed (as by pressurization with an inert gas) although no advantages for this are apparent.

Product Recovery

The product is recovered by conventional techniques of solids separation, such as sedimentation and decantation, filtration or centrifuging. It is readily freed of any retained liquid phase by washing with a dilute alkaline solution, and/or with water, and drying.

Conversion to Magnetic Iron Oxides

By conventional reduction procedures, hematite particles of the present invention have been converted to magnetites having the following property ranges:
Magnetic coercivity, 293–416 oersteds;
Saturization magnetization, 78–88 e.m.u./gram;
Squareness ($\delta_r/\delta_s$), 0.33–0.42.
Upon reoxidation, gamma iron oxides have been obtained having the following property ranges:
Mag. coercivity, 196–306 oersteds;
Sat. magnetization, 66–71 e.m.u./gram;
Squareness ($\delta_r/\delta_s$), 0.32–0.38.
In the following examples, the concentrations of iron in the reaction mixtures are gram ions per liter but the symbol M (for molar) is used for convenience.

EXAMPLE 1

A mixture of 33.93 mls. of 4.42M LiOH and 39.71 ml. of deionized water was added with stirring to 76.37 ml. of 0.983M $Fe_2(SO_4)_3$. Reagent grade chemicals were used. Final concentrations of both iron and lithium were 1.0M. Aliquots were sealed as follows in glass ampoules: ampoules 23 cm. long and 1.0 cm. O.D. (0.8 cm. I.D.) were charged with 7 ml. of reactant mixture; ampoules 22 cm. long and 2.55 cm. O.D. (1.76 cm. I.D.), 25 ml. reactants; and ampoules 30 cm. long and 2.25 cm. O.D. (1.62 cm. I.D.), 38–45 ml. reactants.

The ampoules were sealed in steel bombs and heated to 200°C. with rocking or horizontal agitation. After 3 hours at 200°C., the bombs were allowed to cool slowly overnight. The products were filtered through medium frits, washed thoroughly with water and dried at about 100°C. under a vacuum of less than 1 mm. Hg pressure. The yields of orange-red hematite were 54.0–58.6%. The product had a mean particle length of 0.660±

0.221 micron. Reduction of the iron oxide with hydrogen at 395°C. gave black magnetite containing 24.39% ferrous iron, magnetic coercivity 325 oersteds, saturation magnetization 78 e.m.u/g., and squareness ($\delta_r/\delta_s$) 0.40. Reduction at 364°C. gave magnetite containing 23.62% ferrous iron, coercivity 329 oersteds, saturation magnetization 85 e.m.u./g., and squareness 0.33.

EXAMPLE 2

A mixture of 29.41 ml. of 4.42M LiOH and 34.41 ml. deionized water was added slowly to a rapidly stirred solution of 66.18 ml. of 0.983M $Fe_2(SO_4)_3$. Reagent grade chemicals were used. Final concentrations of both iron and lithium were 1.0M. Aliquots were sealed in glass ampoules as described in Example 1 and heated at greater than 5°/min. to 225°C. After 2 hours at 225°C., the bombs were allowed to cool slowly overnight. The products were recovered as described in Example 1. Yields of reddish-orange alpha-$Fe_2O_3$ were 57.9–60.2%. The product had a mean particle size of 0.782± 0.288 micron. Reduction of the iron oxide particles with hydrogen at 395°C. gave $Fe_3O_4$ containing 25.23% ferrous iron, coercivity 315 oersteds, $\delta$ s 82 e.m.u./g., and squareness 0.39. Magnetite containing 23.76% ferrous iron prepared from these crystals at 395°C. using hydrogen had coercivity 300 oersteds, $\delta$ s 80 e.m.u./g., and squareness 0.40.

EXAMPLE 3

A mixture of 4.524 ml. of 4.42M LiOH and 6.466 ml. of deionized water was added with stirring to 9.010 ml. of 1.11M $Fe_2(SO_4)_3$ in an ice bath. Reagent grade chemicals were used. Final concentration of LiOH was 1.0M; of iron, 1.0M. Seven milliliters of the resulting mixture was sealed in a glass ampoule 23 cm. long and 1.0 cm. O.D. (0.8 cm I.D.). The ampoule was placed in a tight-fitting stainless steel bomb containing a small amount of ammonium hydroxide. The bomb was heated and shaken in an aluminum block to 250°C. at a heat-up rate of 1.6°/min. Heating was continued at 250°C. for 2 hours. The bomb was allowed to cool slowly to room temperature overnight. The contents were filtered, washed thoroughly with water, and dried at about 100°C. and less than 1 mm. Hg. Yield of purple hematite, 0.43 g. (77%). The particle lengths were 1.24 (min.) to 5.14 (max.) microns.

EXAMPLE 4

A reaction similar to Example 3 was run except that the heat-up rate was 4.5°/min. Yield of red hematite, 0.33 g. (59%); particle lengths, 1.04 (min.) to 2.68 (max.) microns.

EXAMPLE 5

A reaction similar to Example 3 was run except that the heat-up rate was 7.3°/min. Yield of red hematite, 0.37 g. (66%); particle lengths, 0.32 (min.) to 1.75 (max.) microns.

EXAMPLE 6

A reaction similar to Example 3 was run except that the heat-up rate was 9.9°/min. Yield of red hematite, 0.39 g. (70%); particle lengths, 0.42 (min.) to 1.06 (max.) microns.

EXAMPLE 7

A reaction similar to Example 3 was run except that the heat-up rate was 17.8°/min. Yield of orange-red hematite, 0.39 g. (70%); particle lengths, 0.14 (min.) to 0.92 (max.) micron.

EXAMPLE 8

A reaction similar to Example 3 was run except that the heat-up rate was 37.4°/min. Yield of orange-red hematite, 0.37 g. (66%); particle lengths, 0.08 (min.) to 0.76 (max.) microns.

EXAMPLE 9

A mixture of 746.7 ml. of 4.42M lithium hydroxide and 901.8 ml. of deionized water was added with rapid stirring to 1351.5 ml. of 1.11M ferric sulfate. Final concentration of iron was 1.0M; of lithium, 1.1M. Reagent grade chemicals were used. The temperature during the addition rose from 19.5° to 29.5°C. The solution pH was 2.493. The mixture was placed in a 2-gallon capacity glass-lined Pfaudler kettle and heated at an average heat-up rate of 1°/min. to 250°C. Heating and stirring were continued for 2 hours at 250°C. followed by slow cooling overnight. The product was filtered and thoroughly washed with water until a negative $BaCl_2$ test was obtained on the filtrate. The initial filtrate pH was 0.787. The hematite was dried overnight at about 60°C. and less than 1 mm. Hg. Yield 188.5 g. (78.7%). The iron oxide contained 67.31% iron, 2.23% sulfate and 0.0137% lithium. The weight loss at 1000°C. was 3.08%. The mean particle size was 1.013± 0.167 microns. When the hematite was reduced with hydrogen at 395°C., magnetite was obtained that contained 23.54% ferrous iron, and had the following magnetic properties: coercivity, 356 oersteds; $\delta$ s, 84 e.m.u./g.; and squareness, 0.39. Upon reduction at 333°C. with hydrogen the resulting magnetite contained 23.20% ferrous iron and had the following magnetic properties: coercivity 416 oersteds; $\delta$ s, 80 e.m.u./g.; and squareness 0.41.

EXAMPLE 10

A mixture of 814.5 ml. of 4.42M LiOH and 834 ml. of deionized water was added with rapid stirring to 1351.5 ml. of 1.11M $Fe_2(SO_4)_3$. The final concentration of iron was 1.0M; of lithium, 1.2M. Reagent grade chemicals were used. The temperature range during the addition was 19°–30°C. The solution pH was 2.925. The mixture was heated in a 2-gallon capacity glass-lined Pfaudler kettle at an average heat-up rate of 1.3°/min. to 250°C. Heating and stirring were continued at 250°C. for 2 hours followed by slow cooling overnight. The product was filtered and washed with water until no sulfate was detected in the wash water. The initial filtrate pH was 0.343. The alpha iron oxide was dried overnight at about 100°C. and a vacuum of less than 1 mm. Hg. Yield, 205.4 g. (85.7%). The iron oxide contained 2.24% sulfate and 0.0105% lithium. The weight loss at 1000°C. was 3.61%. The mean particle size was 1.317± 0.262 microns. When the hematite was reduced by hydrogen at 395°C., the resulting magnetite contained 24.38% ferrous iron and had the following magnetic properties: coercivity 322 oersteds; saturation magnetization 80 e.m.u./g.; squareness 0.35.

EXAMPLE 11

A mixture of 1562.5 ml. of 3.52M LiOH and 844.2 ml. of deionized water was added with rapid stirring to 2593.4 ml. of cold 0.964M ferric sulfate. The final concentration of iron was 1.0M; of lithium, 1.1M. Reagent grade chemicals were used. The mixture was heated to 250°C. at an average heat-up rate of 2.3°/min. with stirring in a 2-gallon capacity tantalum-lined kettle. Heating and stirring were continued at 250°C. for 2 hours followed by slow cooling to room temperature overnight. The product was filtered, washed thoroughly with water, and dried at about 100°C. and less than 1 mm. Hg. pressure. Yield of orange-red hematite, 294.2 g. (73.7%), containing 0.004% lithium and 1.86% sulfate. The mean particle size was 0.822± 0.199 micron. Upon reducing the product with hydrogen at 395°C. the resulting black magnetite contained 24.10% ferrous iron and had the following magnetic properties: coercivity 329 oersteds; $\delta$ s, 82 e.m.u./g.; and squareness, 0.38. Similarly produced magnetite contained 23.76% ferrous iron and had coercivity, 364 oersteds; $\delta$ s, 83 e.m.u./g.; and squareness, 0.40. Oxidation with air at 250°C. gave gamma iron oxide containing 0.10 % ferrous iron; coercivity, 241 oersteds; $\delta$ s, 70; and squareness, 0.38.

EXAMPLE 12

A mixture of 1846.6 ml. of 3.52M lithium hydroxide and 372.5 ml. of deionized water was added with rapid stirring to 2780.9 ml. of 0.99M ferric sulfate. Reagent grade chemicals were used. The final concentration of iron was 1.0 M; of lithium, 1.3M. The mixture was heated to 250°C. at an average heat-up rate of 2.1°/min. with stirring in a 2-gallon tantalum-lined kettle. Heating and stirring were continued at 250°C. for 2 hours followed by slow cooling overnight to room temperature. The product was filtered, washed thoroughly with water, and dried at about 100°C. under a vacuum of less than 1 mm. Hg. Yield of orange-red alpha iron oxide, 321.1 g. (80.5%), containing 0.007% lithium and 1.97% sulfate. The mean particle size was 0.812± 0.182 micron. Reduction with hydrogen at 395°C. gave magnetite, 23.55% ferrous iron; coercivity, 350 oersteds; $\delta$ s, 82 e.m.u./g.; and squareness, 0.39. Oxidation of the magnetite with air at 300°C. gave gamma iron oxide, 0.10% ferrous iron; coercivity, 229 oersteds; $\delta$ s, 70 e.m.u./g.; and squareness, 0.37.

EXAMPLE 13

A mixture of 1604.9 ml. of 4.05 M LiOH and 680.6 ml. of deionized water was added to a rapidly stirred solution of 2714.4 ml. of 0.905 $Fe_2(SO_4)_3$. Reagent grade chemicals were used. The final concentration of iron was 0.98M; of lithium, 1.3M. The mixture was stirred and heated to 250°C. at an average heat-up rate of 1.6°/min. in a 2-gallon capacity tantalum-lined kettle. Heating and stirring were continued for 2 hours at 250°C. followed by slow cooling to room temperature overnight. The product was filtered, washed thoroughly with water and dried overnight at about 100°C. under a vacuum of less than 1 mm. Hg. Yield of red-purple hematite, 338.8 g. (86.3%). The mean particle size was 1.892± 0.466 microns. Reduction with hydrogen at 395°C. gave magnetite, 24.37% ferrous iron; coercivity, 366 oersteds; saturation magnetization, 80 e.m.u./g.; squareness, 0.37. Oxidation of the magnetite with air at 200°C. for 190 hours followed by 250°C. for 48 hours gave gamma iron oxide, 0.37% ferrous iron; coercivity, 196 oersteds; saturation magnetization, 66 e.m.u./g.; squareness, 0.37.

EXAMPLE 14

A mixture of 1470.6 ml. of 4.42M lithium hydroxide and 841.2 ml. deionized water was added with stirring to 2688.2 ml. of 0.930M ferric sulfate. Reagent grade chemicals were used. The final molar concentration of iron was 1.0; of lithium, 1.3M. The mixture was heated and stirred in a 2-gallon capacity tantalum-lined to 250°C. at an average heat-up rate of 1.6°/min. Stirring and agitation were continued at 250°C. for 2 hours followed by slow overnight cooling to room temperature. The product was filtered, thoroughly washed with water, and dried overnight in a vacuum oven at about 100°C. and less than 1 mm. Hg. pressure. Yield, 323.2 g. (81.0%) of red alpha iron oxide. The mean particle size was 0.937± 0.324 micron. Reduction with hydrogen at 395°C. gave black magnetite, 24.28% ferrous iron; coercivity, 293 oersteds; $\delta$ s, 84 e.m.u./g.; and $\delta$ r/$\delta$ s, 0.33. Oxidation of the magnetite at 200°C. for 190 hours followed by 250°C. for 48 hours gave gamma iron oxide, 0.40% ferrous iron; coercivity, 200 oersteds; $\delta$ s, 69, and $\delta$ r/$\delta$ s, 0.32.

The dimensions given in the preceding examples were determined from electron-micrographs of the products described.

The magnetic iron oxides derived from the hematite particles of the invention are novel by reason of their morphology, which remains essentially unchanged during the reduction and reoxidation of the hematite particles. That is, the magnetic oxide particles have the shape, size and fine structures of the parent hematite particles but consist chemically of either magnetite or gamma iron oxide.

I claim:
1. A process for preparing elongated hematite particles comprising:
   a. providing a mixture consisting essentially of ferric sulfate, water and lithium hydroxide in which the concentration of iron sulfate is about 0.2 to about 2.0 molar, the atomic ratio of iron to lithium is from about 0.7 to about 1.5 and the total content of phosphate, molybdenum and tungsten is less than 0.001 molar;
   b. heating said mixture to a temperature within the range of about 150°C. to about 350°C. at a rate of from about 1°/minute to about 38°/minute;
   c. maintaining the mixture at said temperature under at least autogenous pressure for a time period of from about 1 minute to about 80 hours;
   d. cooling the mixture while avoiding the formation of jarosites; and
   e. recovering the resultant particles.
2. The process of claim 1 in which the concentration of ferric sulfate is from about 0.4 to about 0.6 molar, the lithium to iron atomic ratio is from about 0.9 to about 1.2 and the total content of phosphate, molybdenum, tungsten, vanadium, antimony, chromium, arsenic, copper and titanium is less than 0.001 molar.
3. The process of claim 1 in which the mixture is heated at a rate of from about 3°/minute to about 12°/minute to a reaction temperature of from about 240°C. to about 260°C., is maintained at said reaction temperature for a period of from about 1-¾ to about 2-¼ hours and is cooled at a rate of not more than 1°/minute until a temperature of 125°C. or less is reached.
4. The process of claim 1 in which the concentration of iron sulfate is about 0.5 molar, the concentration of LiOH is about 1.0 molar and the mixture is maintained at a temperature of about 250°C. for about 2 hours and then cooled at a rate less than 3°/minute until a temperature of 150° or less is reached.

* * * * *